US006349967B1

(12) United States Patent
Cartwright

(10) Patent No.: US 6,349,967 B1
(45) Date of Patent: Feb. 26, 2002

(54) LOCKING MECHANISM FOR TILT STEERING COLUMN

(75) Inventor: Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/634,386

(22) Filed: Aug. 9, 2000

(51) Int. Cl.[7] .................................................. B62D 1/18
(52) U.S. Cl. .......................... 280/775; 280/779; 74/493; 74/531; 188/267.1; 188/300
(58) Field of Search ................................. 280/775, 779; 74/493, 531; 188/267.1, 267.2, 300; 267/64.12

(56) References Cited

U.S. PATENT DOCUMENTS

| | | | | |
|---|---|---|---|---|
| 4,691,587 A | * | 9/1987 | Farrand et al. ................ | 74/493 |
| 5,363,716 A | * | 11/1994 | Budzik, Jr. et al. ........... | 74/493 |
| 5,439,252 A | | 8/1995 | Oxley et al. ................. | 280/775 |
| 5,449,199 A | * | 9/1995 | Heinrichs et al. ........... | 280/775 |
| 5,613,404 A | * | 3/1997 | Lykken et al. ................. | 74/493 |
| 5,655,757 A | | 8/1997 | Starkovich et al. .... | 267/140.15 |
| 5,813,699 A | * | 9/1998 | Donner et al. .............. | 280/775 |
| 6,152,488 A | * | 11/2000 | Hedderly et al. ........... | 280/775 |

OTHER PUBLICATIONS

Co-pending U.S. Patent Appln. Ser. No. 09/433,594, filed Nov. 2, 1999 entitled "Adaptaive Collapsible Steering Column".

* cited by examiner

Primary Examiner—Robert J. Oberleitner
Assistant Examiner—Mariano Sy
(74) Attorney, Agent, or Firm—Tarolli, Sundheim, Covell, Tummino & Szabo L.L.P.

(57) ABSTRACT

An apparatus (10) for supporting a steering wheel of a vehicle includes a first steering column part (60) and a second steering column part (20) adjacent the first steering column part. The first steering column part (60) and the vehicle steering wheel (16) are supported for pivotal movement about an axis (46) between a plurality of different orientations relative to the second steering column part (20). A locking mechanism is interposed between the first steering column part (60) and the second steering column part (20) for locking the first steering column part in a selected one of the plurality of orientations. The locking mechanism comprises a fluid (90) having a shear strength which varies in response to an energy field acting on the fluid. The apparatus further comprises magnets (114, 116) for varying the shear strength of the fluid (90) by varying the energy field to vary the resistance to movement of the first steering column part (60) relative to the second steering column part (20).

8 Claims, 2 Drawing Sheets

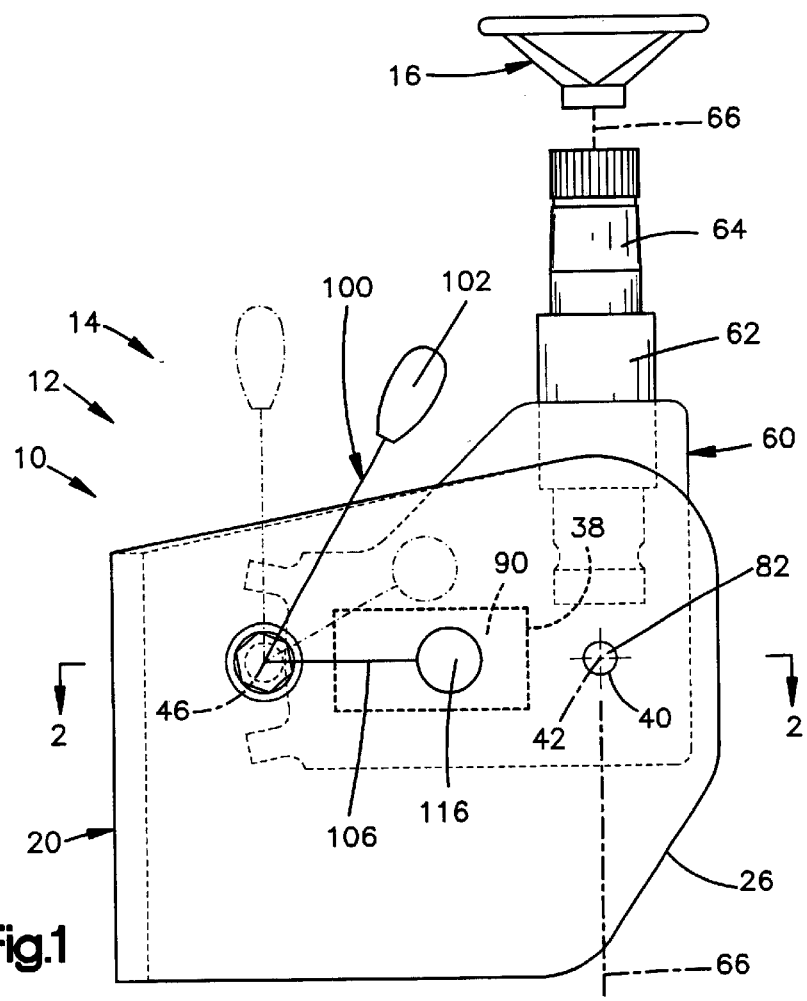
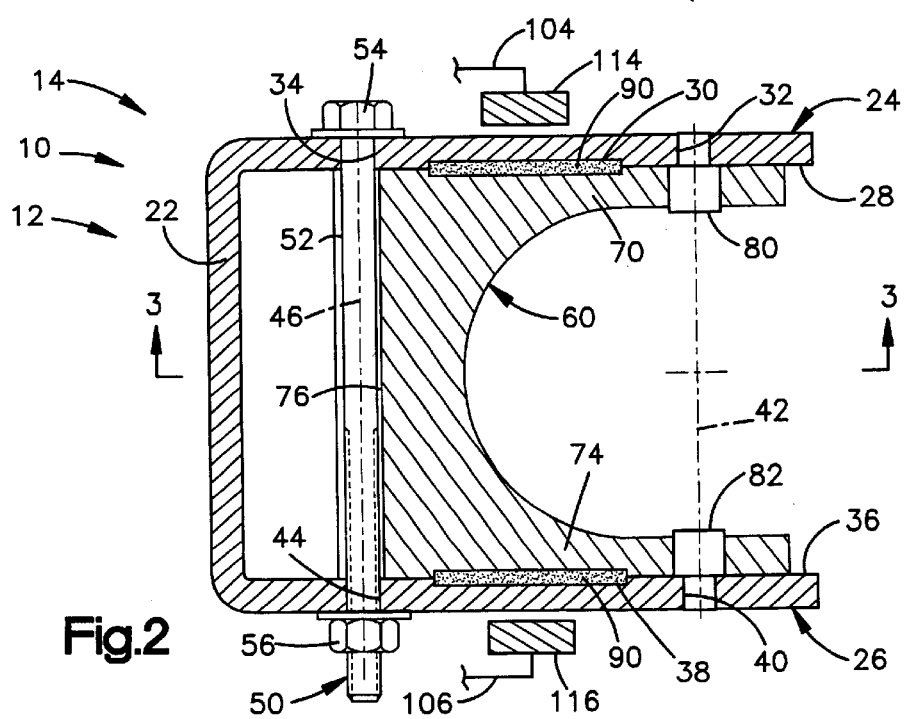

LOCKING MECHANISM FOR TILT STEERING COLUMN

BACKGROUND OF THE INVENTION

1. Technical Field

The present invention relates to a vehicle steering column including a steering wheel, which is pivotable between different positions. In particular, the present invention relates to a mechanism for locking a tilt steering wheel in a particular position.

2. Description of the Prior Art

It is known to provide a steering column with a releasable locking mechanism, which locks the steering wheel in one of a plurality of different tilted positions relative to the vehicle steering column. The locking mechanism can include members releasably clamped together to prevent tilting movement of the steering column member.

It is known to use an electrorheological magnetic fluid in an energy absorber for an engine mount or another structure having two relatively movable parts. Varying the strength of a magnetic field acting on the fluid can vary the shear strength and viscosity of the fluid, thus controlling the energy absorption characteristics of the device.

SUMMARY OF THE INVENTION

The present invention is an apparatus for supporting a steering wheel of a vehicle. The apparatus comprises a first steering column part and a second steering column part adjacent the first steering column part. The first steering column part and the vehicle steering wheel are supported for pivotal movement about an axis between a plurality of different orientations relative to the second steering column part. A locking mechanism is interposed between the first steering column part and the second steering column part for locking the first steering column part in a selected one of the plurality of orientations. The locking mechanism comprises a fluid having a shear strength which varies in response to an energy field acting on the fluid. The apparatus further comprises means for varying the shear strength of the fluid by varying the energy field to vary the resistance to movement of the first steering column part relative to the second steering column part.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic side view of a portion of a vehicle steering column including a tilt locking mechanism constructed in accordance with the present invention;

FIG. 2 is a sectional view taken generally along line 2—2 of FIG. 1; and

DETAILED DESCRIPTION OF AN EMBODIMENT OF THE INVENTION

Figure 3:
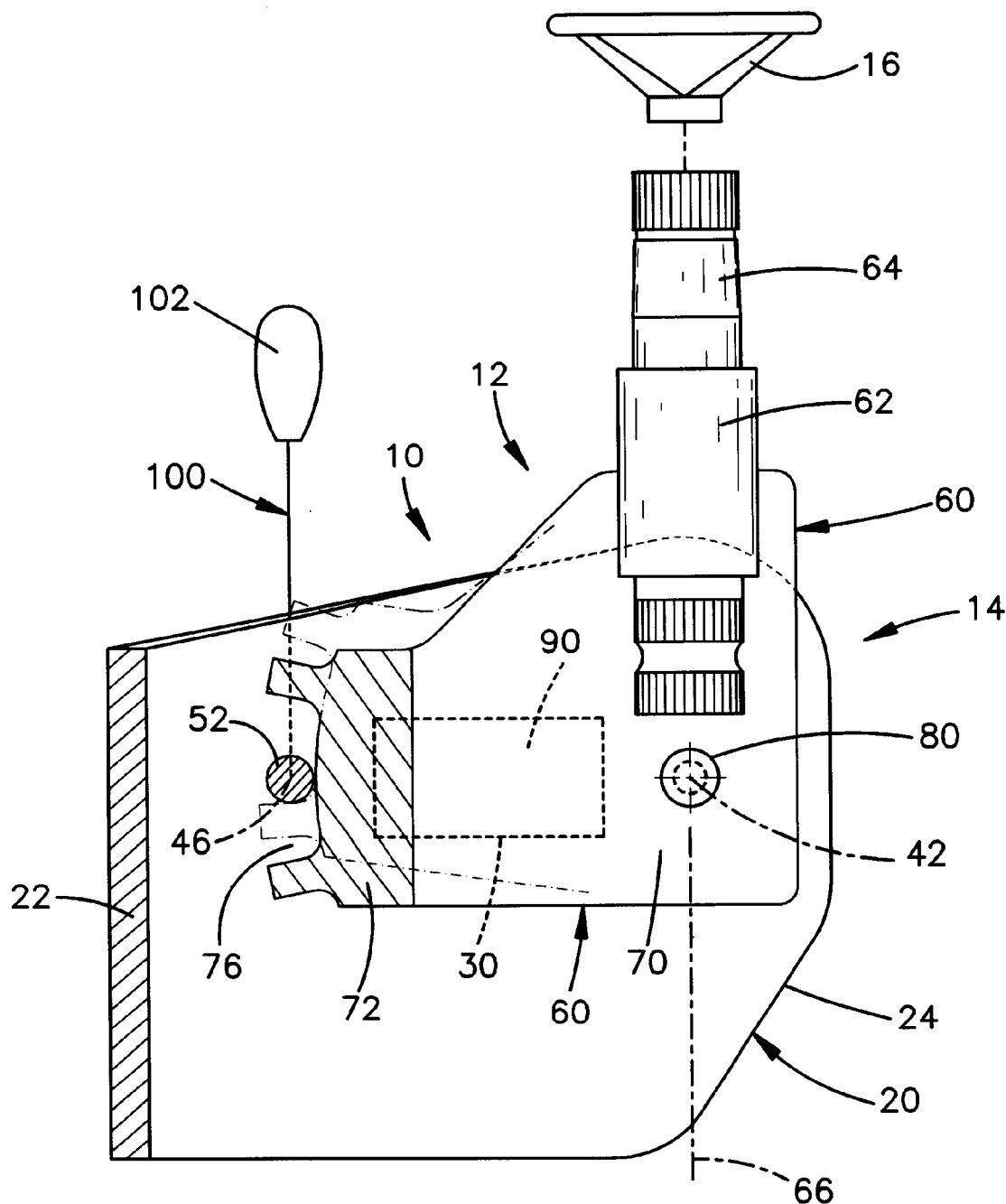
FIG. 3 is a sectional view taken generally along line 3—3 of FIG. 2.

The present invention relates to a vehicle steering column including a steering wheel which is pivotable between different positions. In particular, the present invention relates to a mechanism for locking a tilt steering wheel in one of a plurality of different tilted position. As representative of the present invention, FIG. 1 illustrates a locking mechanism 10, which is a portion of a steering column 14 of a vehicle 12.

The steering column 14 includes a first steering column part or shaft support housing 60 (described below) and a second steering column part or bracket 20. The bracket 20 has a generally U-shaped configuration as viewed in FIG. 2 including a base 22 and first and second side walls 24 and 26, respectively. The base 22 includes mounting portions (not shown), such as fasteners, for fixedly mounting the bracket 20 on the vehicle 12.

The first side wall 24 of the bracket 20 has an inner side surface 28. The first side wall 24 has a fluid chamber or pocket 30 formed on the inner side surface 28. A first pivot opening 32 is formed in the first side wall 24 of the bracket 20. The first pivot opening 32 of the bracket 20 is spaced apart from the base 22 on the opposite side of the fluid pocket 30. A first clamp bar opening 34 is formed in the first side wall 24, between the fluid pocket 30 and the base 22.

The second side wall 26 of the bracket has an inner side surface 36 presented toward the inner side surface 28 of the first side wall 24. The second side wall 26 has a fluid chamber or pocket 38 formed on the inner side surface 36. The second side wall 26 has a second pivot opening 40 spaced apart from the base 22. The first and second pivot openings 32 and 40 define a pivot axis 42, which extends between the first and second pivot openings 32 and 40.

A second clamp bar opening 44 is formed in the second side wall 26 of the bracket 22, between the fluid pocket 38 and the base 22. The second clamp bar opening 44 is aligned with the first clamp bar opening 34. The first and second clamp bar openings 34 and 44 define a clamp bar axis 46 which extends between the first and second clamp bar openings.

A clamp bar 50 extends through the aligned clamp bar openings 34 and 44 in the side walls 24 and 26 of the bracket 22. The clamp bar 50 can have different forms, but in the illustrated, simplified, embodiment, includes a bolt 52 having a head 54 in abutting engagement with the outer side surface of the first side wall 24 and a nut 56 in abutting engagement with the outer side surface of the second side wall 26 of the bracket 20. The nut 56 is rotatable on the bolt 52, in a manner described below, to apply an inwardly directed clamping force to the side walls 24 and 26 of the bracket 20.

The shaft support housing 60 has a support portion 62 which rotatably supports the steering shaft 64 for rotation about a steering axis 66. The steering shaft 64 supports the vehicle steering wheel 16 for rotation about the steering axis 66.

The housing 60 is received between the two side walls 24 and 26 of the bracket 20. The housing 60 has a first side wall 70 which is in abutting sliding engagement with the inner side surface 28 of the first side wall 24 of the bracket 20. The housing 60 has a second side wall 74 which is in abutting sliding engagement with the inner side surface 36 of the second side wall 26 of the bracket 20. The housing 60 has a back wall 72 which includes a slot 76 through which the clamp bar 50 extends.

A first pivot pin 80 extends from the first side wall 70 of the housing 60 into the first pivot opening 32 in the bracket 20. A second pivot pin 82 extends from the second side wall 74 of the housing 60 into the second pivot opening 40 the bracket 20. The pivot pins 80 and 82 support the housing 60 on the bracket 20 for pivotal movement relative to the bracket about the pivot axis 42. During such pivotal movement, the side walls 70 and 74 of the housing 60 slide against the side walls 24 and 26, respectively, of the bracket 20.

The fluid pockets 30 and 38 in the bracket 20 contain a fluid 90, in the nature of a grease, whose viscosity and shear strength can be varied by applying an energy field to the fluid. The fluid 90 is preferably an electrorheological magnetic fluid whose viscosity and shear strength can be varied by controlling the strength of a magnetic field applied to the fluid.

The fluid 90 in the pocket 30 of the first side wall 24 of the bracket 20 contacts the first side wall 70 of the housing 60. The fluid 90 in the pocket 38 of the second side wall 26 of the bracket 20 contacts the second side wall 74 of the housing 60. The fluid 90 is thus interposed between the bracket 20 and the shaft support housing 60 and can thus affect movement of the housing relative to the bracket. When the housing 60 is pivoted relative to the bracket 20, the relative movement between the housing and the bracket puts a shear stress on the fluid 90. The relative viscosity and shear strength of the fluid 90 affect the resistance to pivoting of the housing 60 relative to the bracket 20.

The locking mechanism 10 includes a release lever shown schematically at 100. The release lever 100 is supported on the vehicle 12 for pivotal movement relative to the bracket 20, about the clamp bar axis 46, between a locked position shown in solid lines in FIG. 3 and a released position shown in dashed lines in FIG. 3. The release lever 100 has a portion 102 which is manually engageable by the driver of the vehicle to effect adjustment of the release lever. The release lever 100 has first and second arm portions 104 and 106.

A magnet assembly is located on the release lever 100. The magnet assembly includes two permanent magnets shown schematically at 114 and 116. The one permanent magnet 114 is located on the first arm portion 104 of the release lever 100. The other permanent magnet 116 is located on the second arm portion 106 of the release lever 100.

When the release lever 100 is in the released position, the first magnet 114 is spaced apart from the fluid 90 in the first pocket 30 by a first distance. The first distance is great enough that the magnetic field of the first magnet 114 does not have a significant effect on the viscosity and shear strength of the fluid 90 in the first pocket 30. At the same time, the second magnet 114 is spaced apart from the fluid 90 in the second pocket 38 by the first distance. The first distance is great enough that the magnetic field of the second magnet 116 does not have a significant effect on the shear strength of the MR fluid 90 in the second pocket 38.

When the release lever 100 is in the locked position, the first magnet 114 is spaced apart from the fluid 90 in the first pocket 30 by a second distance, less than the first distance. The second distance is small enough that the magnetic field of the first magnet 114 has a significant effect on the viscosity and shear strength of the fluid 90 in the first pocket 30. At the same time, the second magnet 116 is spaced apart from the fluid 90 in the second pocket 38 by the second distance, and the magnetic field of the second magnet has a significant effect on the viscosity and shear strength of the fluid in the second pocket.

The release lever 100 is also operative, in a manner not shown, to effect tightening and loosening of the clamp bar 50. Specifically, when the release lever 100 is in the locked position, the clamp bar 50 applies an inwardly directed clamping force on the first and second side walls 24 and 26 of the bracket 20. The clamping force resists pivoting movement of the shaft support housing 60 relative to the bracket 20. When the release lever 100 is in the released position, the clamping force on the first and second side walls 24 and 26 of the bracket 20 is decreased.

To adjust the position of the steering wheel 16, the vehicle driver engages the manually engageable portion 102 of the release lever 100. The release lever 100 is moved or pivoted from the locked position to the released position. The permanent magnets 114 and 116 are thereby moved away from the fluid 90 in the fluid pockets 30 and 38. The strength of the magnetic field applied to the fluid 90 decreases. As the strength of the magnetic field decreases, the viscosity and shear strength of the fluid 90 decrease accordingly, and the resistance to pivoting of the housing 60 relative to the bracket 20 decreases accordingly. When the release lever 100 is in the released position, the mechanical clamping force exerted by the clamp bar 50 on the first and second side walls 24 and 26 of the bracket 20 also decreases. As a result, the driver is able to tilt the steering wheel 16, moving the housing 60 relative to the bracket 20.

When the driver has thereafter placed the steering wheel 16 in the desired tilted position, the driver moves the release lever 100 back to the locked position. As this movement occurs, the permanent magnets 114 and 116 are moved back to their initial position adjacent to the fluid 90 in the fluid pockets 30 and 38. The strength of the magnetic fields applied to the fluid 90 increases. The viscosity and shear strength of the fluid 90 increase accordingly, and the resistance to pivoting of the housing 60 relative to the bracket 20 increases accordingly. When the release lever 100 is in the locked position, the mechanical clamping force exerted by the clamp bar 50 resists pivoting movement of the shaft support housing 60 relative to the bracket 20. As a result, the clamp bar 50 and the fluid 90 cooperate to provide sufficient resistance between the housing 60 and the bracket 20 to lock the steering column 14 in the selected position of tilt.

From the above description of the invention, those skilled in the art will perceive improvements, changes and modifications in the invention. For example, the locking force provided by the electrorheological magnetic fluid may alone be sufficient to effect locking of the steering wheel. Also, an electromagnet could be used instead of a permanent magnet, in which case a constant electric current might be needed to maintain the locking assembly in the locked condition. Alternatively, the magnetic fluid could be replaced with an electrorheological fluid, in which case an electric current would be needed to maintain the locked condition of the locking mechanism. Such improvements, changes and modifications within the skill of the art are intended to be covered by the appended claims.

I claim:

1. An apparatus for supporting a steering wheel of a vehicle, said apparatus comprising:

a first steering column part and a second steering column part adjacent said first steering column part, said first steering column part and the vehicle steering wheel being supported for pivotal movement about an axis between a plurality of different orientations relative to said second steering column part; and a locking mechanism interposed between said first steering column part and said second steering column part for locking said first steering column part in a selected one of said plurality of orientations;

said locking mechanism comprising a fluid having a shear strength which varies in response to an energy field acting on said fluid; and means for varying the shear strength of said fluid by varying said energy field to vary the resistance to movement of said first steering column part relative to said second steering column part.

2. An apparatus as set forth in claim 1 wherein said fluid is an electrorheological magnetic fluid whose shear strength varies in response to a change in magnetic field acting on said fluid.

3. An apparatus as set forth in claim 2 wherein said means for applying an energy field comprises a magnet.

4. An apparatus as set forth in claim 3 wherein said magnet is a permanent magnet.

5. An apparatus as set forth in claim 1 wherein said first and second steering column parts are in sliding engagement with each other, and said fluid is disposed between said first and second column parts to control sliding movement between them.

6. An apparatus as set forth in claim 1 wherein said first steering column part is a member which supports a steering shaft and said second steering column part is a support bracket.

7. An apparatus as set forth in claim 6 wherein said member and said support bracket are in sliding engagement with each other and said fluid is disposed between them to control sliding movement between them.

8. An apparatus as set forth in claim 1 wherein said fluid is received in a chamber in a first one of said first and second steering column parts, said chamber being adjacent a relatively slidable wall portion of a second one of said first and second steering column parts.

* * * * *